(12) United States Patent
Schill

(10) Patent No.: US 7,169,034 B2
(45) Date of Patent: Jan. 30, 2007

(54) BLADE MOUNTING DEVICE

(75) Inventor: Joachim Schill, Kehl (DE)

(73) Assignee: Maja-Maschinenfabrik Hermann Schill GmbH & Co, Kehl-Goldscheuer (DE)

( * ) Notice: Subject to any disclaimer, the term of this patent is extended or adjusted under 35 U.S.C. 154(b) by 186 days.

(21) Appl. No.: 10/333,158

(22) PCT Filed: Jul. 19, 2001

(86) PCT No.: PCT/DE01/02648

§ 371 (c)(1),
(2), (4) Date: May 18, 2004

(87) PCT Pub. No.: WO02/11546

PCT Pub. Date: Feb. 14, 2002

(65) Prior Publication Data

US 2004/0198207 A1 Oct. 7, 2004

(30) Foreign Application Priority Data

Aug. 3, 2000 (DE) ............... 100 38 579

(51) Int. Cl.
*A22C 17/02* (2006.01)
(52) U.S. Cl. ................ 452/119

(58) Field of Classification Search ........ None
See application file for complete search history.

(56) References Cited

U.S. PATENT DOCUMENTS

| 3,496,823 | A |   | 2/1970  | Kruse |
|-----------|---|---|---------|-------|
| 3,779,123 | A | * | 12/1973 | Chafee ............ 83/698.41 |
| 4,472,989 | A | * | 9/1984  | Endo ............. 83/162 |
| 4,730,368 | A | * | 3/1988  | Townsend ............ 452/127 |
| 5,494,478 | A |   | 2/1996  | Long et al. |

FOREIGN PATENT DOCUMENTS

| EP | 0437873 | 7/1991 |
| GB | 2182881 | 5/1987 |

* cited by examiner

*Primary Examiner*—Thomas Price
(74) *Attorney, Agent, or Firm*—Orum & Roth LLC

(57) ABSTRACT

A blade mounting device for the mounting of blades, in particular, for skinning and stripping machines with a blade mount fixing (1), a blade support (3), a retaining strip (6) and a tensioning device (8) for holding the blade support and retaining strip together is disclosed. A swallow-tail shaped recess (17, 18) is provided across the total width of the facing surfaces of the blade support and retaining strip. A shaft (9), centrally mounted in the retaining strip (6) and eccentrically mounted in the blade mount fixing (1) serves as tensioning device.

6 Claims, 2 Drawing Sheets

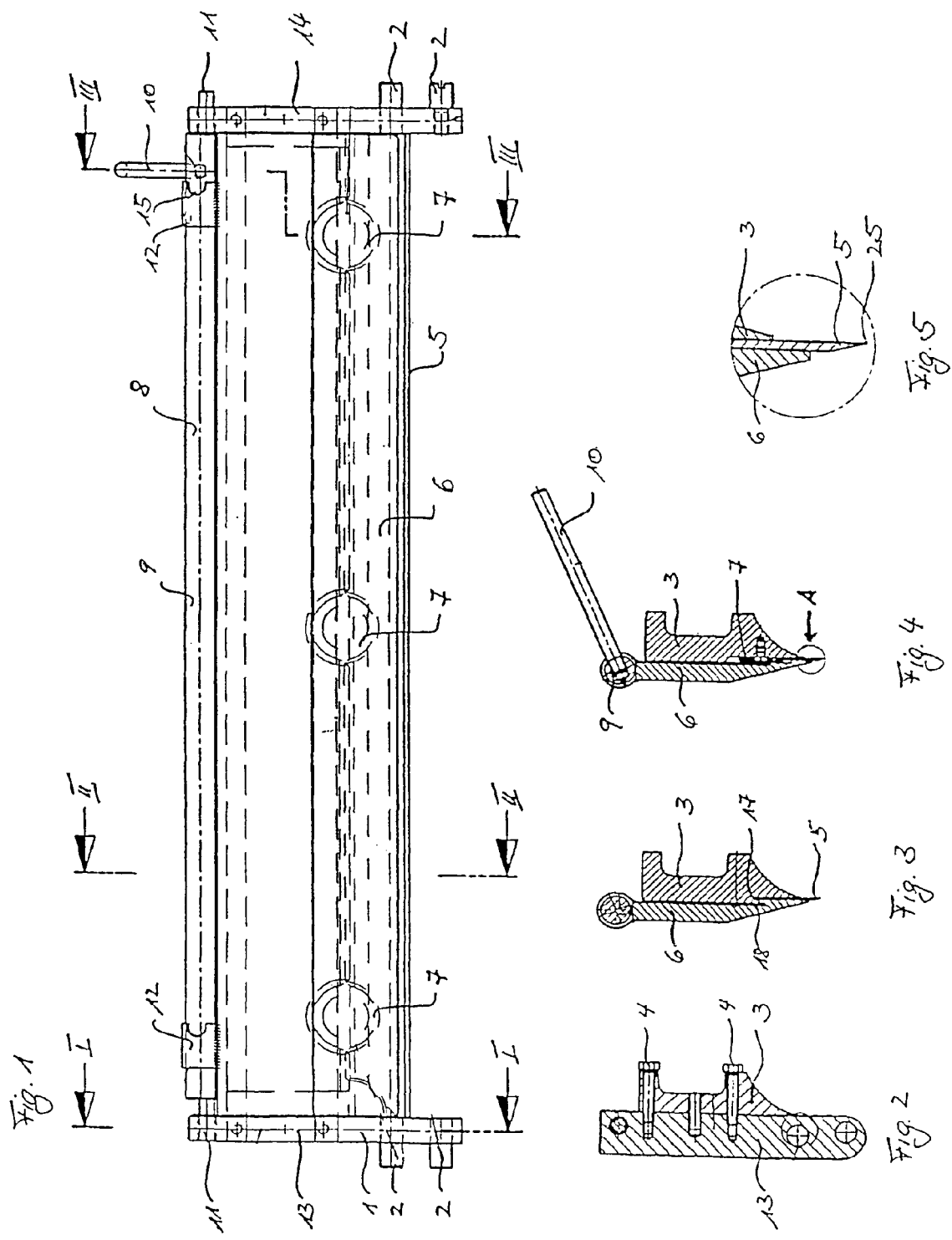

BLADE MOUNTING DEVICE

STATE OF THE ART

Figure 6:
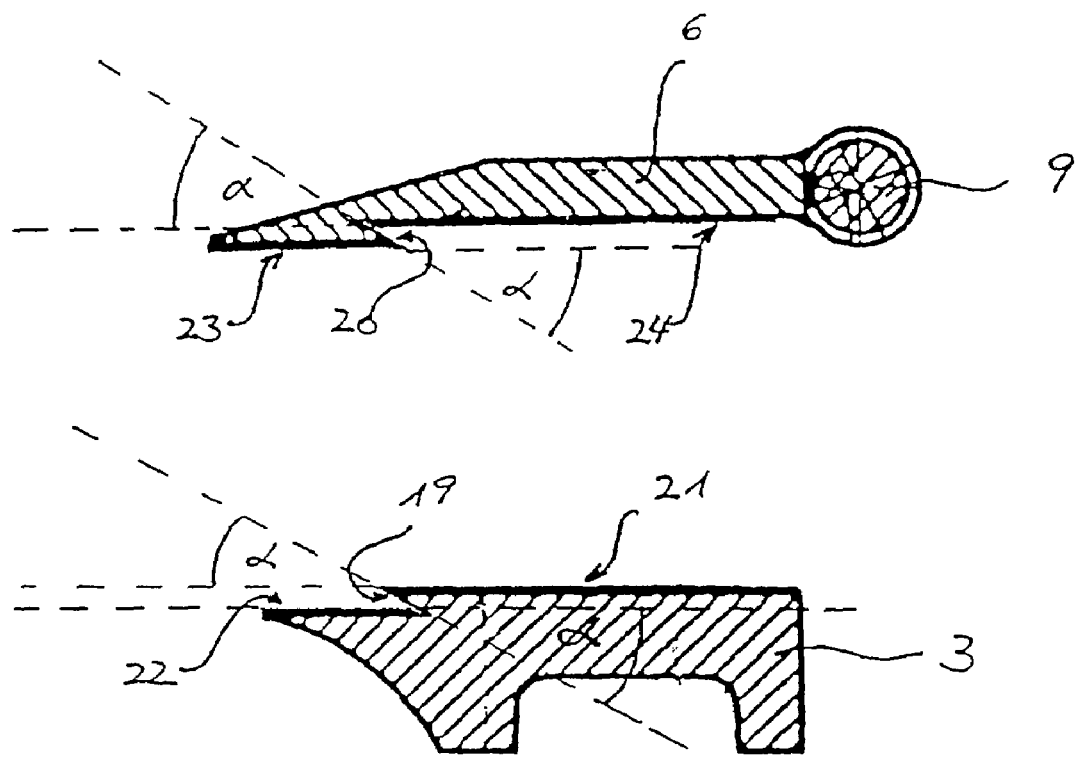

The invention is a blade-mounting device according to the description, claims, and drawings set out below.

Such blade-mounting devices are used in particular for skinning and slab removal machines during meat, fish and poultry processing. For the removal of skin or slab the processing goods are pressed against a blade and moved in relation to the blade. The blade is clamped between a blade support on the one hand and a retaining strip on the other hand. The blade support is fastened to a blade mount suspension, which is used in the machine, in particular a skinning and slab removal machine.

In order to hold the blade between the blade support and the retaining strip and to prevent shifting of the same, the blade support and retaining strip are pressed together. For this purpose bolt connections are well-known from the state of the art. These have the disadvantage that in order to remove the blade or for cleaning of the gaps between blade, blade support and retaining strip, the entire blade-mounting device needs to be removed from the machine, since the screws are otherwise not accessible. In addition, the repeated opening and closing of the bolt connection leads to wear of the threads. Furthermore, the force exercised on the blade by the retaining strip is different with different strong tightened screws along the entire length of the blade.

From DE 690 13 138 T2 a knife mounting device is well-known, in which the retaining strip with recesses engages in screw heads projecting from the surface of the blade support. Blade support and retaining strip are pressed apart by a cam mechanism at the side facing away from the blade. This leads to the fact that blade support and retaining strip are pressed together in the area of the blade. Thus the blade is localized. A bolt connection between blade support and retaining strip is thereby eliminated. It proves to be unfavorable with this device that the force exercised by the retaining strip on the blade is punctually larger in the area of the screws than in the remaining areas. In addition the disadvantage exists that for removing or cleaning the blade and the gaps between blade, blade support and retaining strip the entire retaining strip must be removed from the blade-mounting device and be put down in another place. It cannot remain at the retaining strip. During placing the retaining strip on the blade support again the recesses must be aligned with the screw heads. This area however can't be seen when placing the retaining strip. If the retaining strip is not put on accurate, then the edges of the recess can be damaged. This can lead to the fact that no sufficient forces can be applied when clamping the retaining strip and the blade support for clamping the blade.

THE INVENTION AND ITS ADVANTAGES

In contrast to this, the blade-mounting device according to the invention with the characteristic features as defined in the claims has the advantage that the blade support and the retaining strip engage into one another over their entire width and are clamped against one another. For this a dove tail-like shoulder is intended in each case in the blade support and in the retaining strip. This dove tail-like shoulder runs parallel to the front edges of the blade support and the retaining strip, resting against the blade. The dovetailed shoulder is intended behind the area of the blade support and the retaining strip, against which the blade rests. Therefore the shoulder does not affect the placing of the blade. The shoulder is formed by a step in the surfaces of the blade support and the retaining strip facing each other. The step results from a surface, which is under a vertical angle against the two surface parts of the blade support and the retaining strip, forming the steps. The dovetailed shoulders form thereby in each case a wedge.

A shaft serves as tensioning device, which is mounted with its ends eccentric at the blade mount suspension and is mounted centered in the retaining strip. For tightening of the blade the dove tail-like shoulders of the blade support and the retaining strip engage like wedges into one another and are clamped against each other through rotation of the eccentrically mounted shaft. The surfaces of the blade support and the retaining strip slide one on the other while the shoulders engage into one another and are thereby guided accurately without accessory. The rotation provides a movement of the blade support and the retaining strip relative to each other, which take place exactly perpendicular to the two shoulders. It is thereby not possible to jam or damage the shoulders when putting the retaining strip on the blade support and when tightening it.

In addition the shaft serves the purpose to lift the retaining strip off the blade support. The retaining strip does not need to be removed completely from the blade-mounting device, but it is only swiveled against the blade support. The bearing for the shaft is intended at the side of the retaining strip facing away from the blade. Thus an accurate guidance of the retaining strip relative to the blade support is also ensured during lifting. Damage of the dovetailed shoulder of the blade or other parts of the blade-mounting device is thereby prevented. The blade-mounting device according to the invention is thereby wear resistant. It ensures also during repeated opening and closing of the tensioning device a uniform and strong pressing of the retaining strip against the blade support and thus against the blade.

After a favorable embodiment of the invention a lever is intended as operating device at the shaft. This lever can be operated manually. A rotation of the lever of approx. 180° is sufficient for loosening and tightening the tensioning device. The lever is located in the area of an end of the shaft, so that it is easily accessible for the user. It is also possible to intend two levers, whereby each of the two levers is located at an end of the shaft. The two levers can also be connected through a handle.

After a further favorable embodiment of the invention, the shaft is mounted axial adjustable in the blade mount suspension. The bearing exhibits at the retaining strip for the shaft a recess for hanging the lever. Thus several positions of the shaft and the lever are possible. In a first position the lever is hung into the recess of the bearing of the retaining strip. If the shaft is now rotated with the help of the lever, then the retaining strip can be lifted off the blade support or lowered on it. If the retaining strip rests on the blade support, then the shaft is shifted so far that the lever is no longer engaged in the recess of the bearing of the retaining strip. A following rotation of the shaft with the help of the lever leads to clamping the retaining strip against the blade support.

After a further favorable embodiment of the invention either one stop for the blade is intended at the blade support, which extends over the entire width of the blade support, or there are several stops intended, which extend in each case only over a section of the blade support. Rails or disks serve for example as stops. For example several round disks of the same diameter can be put collinear on the blade support. The stops facilitate the accurate positioning of the blade. The blade is positioned preferably in such a way that its cutting edge runs parallel to the front edges of the retaining strip and the blade support. In order to be able to affect the depth of the cut, the stops are variable. If several round disks are used as stops, then the position of the blade relative to the blade mount can be changed by using disks of different diameters. If rails are used as stop, then the attachment of the border to the blade mount can make a shifting of the border possible.

Further benefits and favorable embodiments of the invention can be taken from the following description, the drawing and the claims.

DRAWING

A design example of a blade-mounting device according to the invention is represented in the drawing and following described in more detail. Shown are:

FIG. 1 Blade-mounting device in a view from above,

FIG. 2 Cross-section through the blade-mounting device in accordance with FIG. 1 in the place marked with I, FIG. 3 Cross-section through the blade-mounting device in accordance with FIG. 1, in the place marked with II, FIG. 4 Cross-section through the blade-mounting device in accordance with FIG. 1, in the place marked with III FIG. 5 Section of FIG. 4, in the place marked with A, FIG. 6 Blade support and retaining strip in magnified view.

DESCRIPTION OF THE DESIGN EXAMPLE

In FIGS. 1 to 4 a blade-mounting device is represented in a view from above and in various cutting planes. A blade mount suspension 1 exhibits lateral pegs 2, with which the blade-mounting device can be hung up into a skinning and slab removal machine. A blade support 3 is fastened with screws 4 to the blade mount suspension 1, as can be seen in FIG. 2. The blade support cannot be seen in FIG. 1, since it is located at the bottom part of the blade-mounting device. A blade 5 is laid on the blade support, which is clamped on the blade support by means of a retaining strip 6. Disks 7 are intended as stop for the blade, on which the blade with the side facing away from the cutting edge is laid against. The disks are attached by means of a screw to the surface of the blade support that is facing the retaining strip. The disks 7 are shown only dashed in FIG. 1, since they are not observable by the viewer in this view. They can however be seen in the sectional view in accordance with FIG. 4.

A tensioning device 8 serves for the purpose of tightening the blade 5 between the blade support 3 and the retaining strip 6. It consists essentially of a shaft 9 and a lever 10. The shaft 9 is mounted eccentric in the side parts 13 and 14 of the blade mount suspension 1 with the help of its bearing pegs 11. In the bearings 12 of the retaining strip however, the shaft is guided centered. The two bearing pegs 11 of the shaft 9 exhibit a smaller diameter than the remaining shaft. The section of large diameter of the shaft is shorter than the distance of the two side parts 13 and 14 of the blade mount suspension. This permits a shifting of the shaft in axial direction. Recesses 15 are intended in the bearings 12 of the retaining strip. In a first position, which cannot be seen in FIG. 1, the shaft 9 is axially shifted so far to the left that the lever 10 for the activation of the shaft engages in the recess 15. If the shaft 9 is now rotated with the help of the lever, then the retaining strip 6 can be lifted off the blade support 3 and again lowered on it. This position permits the replacement of the blade and a cleaning of the gaps. In a second position the shaft 9 is axially shifted so far that the lever 10 is no longer engaged in the recess 15. This position is represented in FIG. 1. In this position of the shaft the retaining strip 6 is lowered on the blade support. If the shaft 9 is now rotated with the help of the lever 10, then the blade support 3 and the retaining strip 6 are clamped against each other due to the eccentric mount of the shaft in the side parts 13 and 14 of the blade mount suspension. The surfaces of the retaining strip 6 and the blade support 3 facing each ether slide on each other.

As can be seen in FIGS. 3 and 4, the blade support 3 and the retaining strip 6 exhibit in each case a dove tail-like shoulder 17 and 18 at the surfaces facing each other. The dove tail-like shoulder is formed by a step in the two surfaces, at which the surface 19 respectively 20 encloses with the surface portions 21 and 22 respectively 23 and 24 in each case a vertical angle a. This creates a wedge. This detail is represented for clarification in FIG. 6. The blade is located in front of the two dovetailed shoulders 17 and 18. In the areas of the disks 7 serving as stop for the blade the dovetailed shoulders are interrupted. This can be seen in FIG. 4. The representation in FIG. 5 shows that the blade 5 extends with its cutting edge 25 beyond the blade support 3 and the retaining strip 6.

For the tightening of a blade 5 the retaining strip 6 is raised with the help of the lever 10 engaged into the recesses 15 and the blade 5 is laid on the blade support 3 at the disks 7. Subsequently, the retaining strip 6 is lowered on the blade support 3 with the help of the lever 10 still engaged into the recesses 15. Then the shaft 9 is axially shifted, so that the lever 10 does not engage anymore in the recess 15. Subsequently, the shaft is rotated with the help of the lever which leads due to the eccentric mount of the shaft 9 to the fact that the retaining strip 6 shifts in relation to the blade support 3. The shift takes place perpendicular to the dovetailed shoulders 17 and 18. In the case of this shift the surfaces of the blade support 3 and the retaining strip 6 facing each other slide relatively to each other. Thereby the dovetailed shoulder 18 of the retaining strip engages in the dovetailed shoulder of the blade support like a wedge. This leads to the fact that the surfaces of the blade support 3 and the retaining strip 6 facing each other turned are clamped against each other. The blade is clamped between the blade support 3 and the retaining strip 6 by the thereby created force. The force is equal over the entire width of the blade support.

All features represented in the description, the following claims and the drawing can be relevant for the invention both individually and in arbitrary combination with one another.

REFERENCE SYMBOL LIST

1 Blade mount suspension
2 Peg
3 Blade support
4 Screw
5 Blade
6 Retaining strip
7 Disk
8 Tensioning device
9 Shaft
10 Lever
11 Peg
12 Bearing in the retaining strip
13 Side part of the blade mount suspension
14 Side part of the blade mount suspension
15 Recess
16
17 Dovetailed shoulder of the blade support 18 Dovetailed shoulder of the retaining strip
19 Surface of the shoulder of the blade support
20 Surface of the shoulder of the retaining strip
21 Area of the surface of the blade support
22 Area of the surface of the blade support
23 Area of the surface of the retaining strip
24 Area of the surface of the retaining strip
25 Cutting edge

The invention claimed is:

1. Blade-mounting device for the mounting of oblong, flat blades with a cutting edge, in particular
   with a blade mount suspension for the attachment of the blade-mounting device to a further device, in particular to a slab removal and skinning machine,
   with a blade support which is attached to the blade mount suspension, the blade rests along a portion of its surface against said blade support,
   with a retaining strip for fastening the blade to the blade support, resting partially against the blade support and partially against the blade, and
   with a tensioning device for clamping the blade support and the retaining strip together,
   characterized by the fact,
   that the blade support exhibits at the surface facing the retaining strip a first dove tail-like shoulder over its entire width,
   that the retaining strip exhibits at the surface facing the blade support a second dove tail-like shoulder over its entire width, which engages in the first dove tail-like shoulder like a wedge,
   that as tensioning device a shaft is intended, which is mounted eccentric at the blade mount suspension and is mounted centered in the retaining strip, whereby said shaft can be driven into rotation by an operating device.

2. Blade-mounting device according to claim 1, characterized by the fact that a lever is intended as operating device at the shaft.

3. Blade-mounting device according to claim 2, characterized by the fact that the shaft is mounted axial adjustable in the blade mount suspension, and that the bearing exhibits at the retaining strip for the shaft a recess for hanging the lever.

4. Blade-mounting device according to claim 1, characterized by the fact that a stop for the blade is intended at the blade support.

5. Blade-mounting device according to claim 2, characterized by the fact that a stop for the blade is intended at the blade support.

6. Blade-mounting device according to claim 3, characterized by the fact that a stop for the blade is intended at the blade support.

* * * * *